(12) United States Patent
Tsuji et al.

(10) Patent No.: US 8,110,124 B2
(45) Date of Patent: Feb. 7, 2012

(54) METHOD OF PREPARING FLUORESCENT BODY PRECURSOR

(75) Inventors: Yoshihisa Tsuji, Kurashiki (JP); Hideharu Iwasaki, Kurashiki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 486 days.

(21) Appl. No.: 12/373,989

(22) PCT Filed: Jul. 26, 2007

(86) PCT No.: PCT/JP2007/064711
§ 371 (c)(1),
(2), (4) Date: Jan. 15, 2009

(87) PCT Pub. No.: WO2008/013243
PCT Pub. Date: Jan. 31, 2008

(65) Prior Publication Data
US 2009/0166587 A1    Jul. 2, 2009

(30) Foreign Application Priority Data

Jul. 27, 2006   (JP) .................................. 2006-204843

(51) Int. Cl.
  *C09K 11/56*    (2006.01)
(52) U.S. Cl. ................. 252/301.4 R; 423/508; 423/511; 423/594.16; 423/622; 252/301.4 F; 252/301.4 P; 252/301.4 S; 252/301.4 H; 252/301.6 S; 252/301.6 R; 252/301.6 P; 252/301.6 F
(58) Field of Classification Search . 252/301.4 R–301.6 P; 423/508, 511, 594.16, 622
See application file for complete search history.

(56) References Cited

U.S. PATENT DOCUMENTS 7,326,366 B2    2/2008   Aiba et al.

FOREIGN PATENT DOCUMENTS

| EP | 2 135 918 A1 | 12/2009 |
|---|---|---|
| JP | 4 202045 | 7/1992 |
| JP | 6 330035 | 11/1994 |
| JP | 6 336587 | 12/1994 |
| JP | 7 62342 | 3/1995 |
| JP | 8 183954 | 7/1996 |
| JP | 63 222063 | 9/1998 |
| JP | 2005 139372 | 6/2005 |
| JP | 2005 281451 | 10/2005 |
| JP | 2005 306713 | 11/2005 |
| JP | 2007 224174 | 9/2007 |
| WO | WO 2007/043676 | * 4/2007 |

OTHER PUBLICATIONS

Li, X. et al., "Preparation of SrA12O4:$Eu^{2+}$, $Dy^{3+}$ nanometer phosphors by detonation method", Materials Letters, vol. 60, pp. 3673-3677, (2006).

Horiguchi, Y., "Pre-shock Treatment for Preparation of $Zn_2SiO_4$ (Mn) Phosphor Having High Luminescence Intensity", Naturwissenschaften, vol. 53, No. 18, p. 476, (1966).

A I Lapshin, et al., "The possible activation of ZnS crystal phosphors by the method of explosive charging", Database Inspec [Online] The Institution of Electrical Engineers, vol. 14, No. 6, XP-002587065, Jan. 1, 1971, pp. 1020-1026 (Abstract only).

I Thkek-De, et al., "The shock-wave synthesis of ultradisperse chromium-doped alumina powder", Database Inspec [Online] The Institution of Electrical Engineers, vol. 27, No. 7, XP-002587066, Jul. 1, 2001, pp. 533-535 (Abstract only).

* cited by examiner

*Primary Examiner* — Carol M Koslow
(74) *Attorney, Agent, or Firm* — Oblon, Spivak, McClelland, Maier & Neustadt, L.L.P.

(57) ABSTRACT

To produce fluorescent bodies providing high brightness and high energy efficiency, a method of preparing a fluorescent body precursor is provided to enable an activator having a large ionic radius to be doped arbitrarily. The problems described above are solved by a method of preparing a fluorescent body precursor, which method is characterized by comprising applying a shock pressure of 0.1 GPa or higher to a mixture consisting essentially of a fluorescent body base, an activator and a co-activating particle-growth promoter to dope the activator into the fluorescent body base in the presence of the co-activating particle-growth promoter.

19 Claims, 2 Drawing Sheets

[Figure 1]
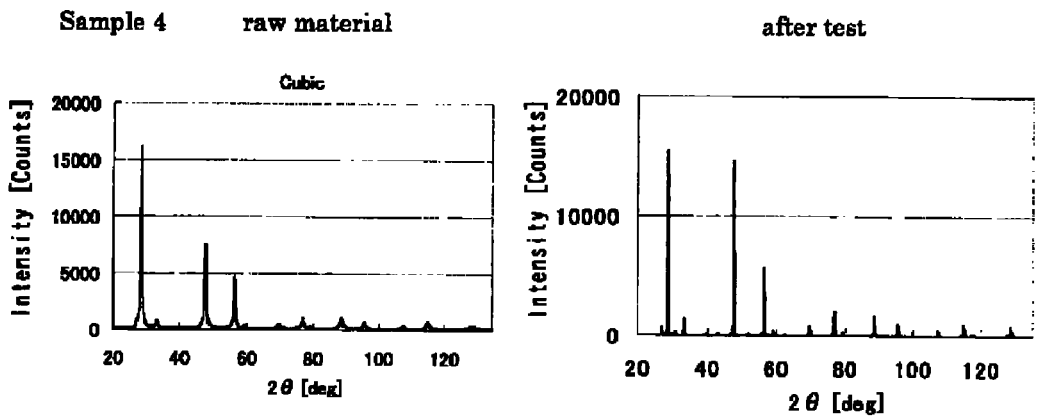
[Figure 2]
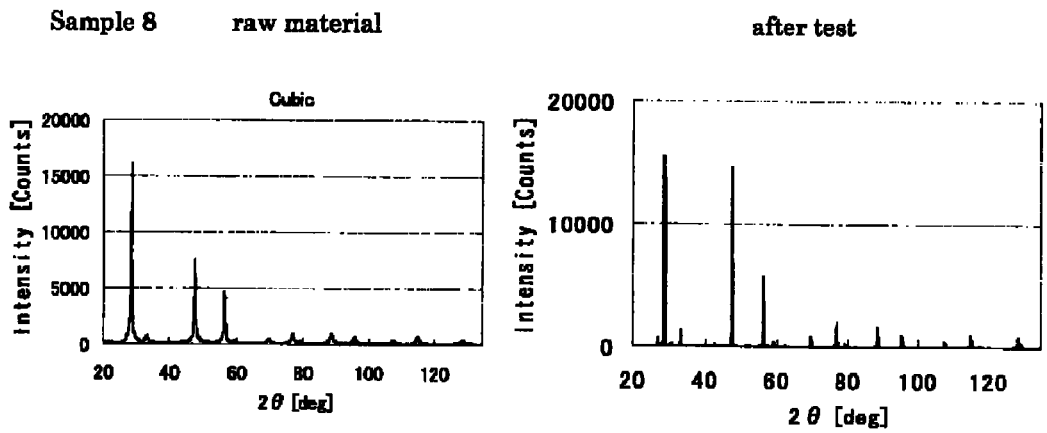
[Figure 3]
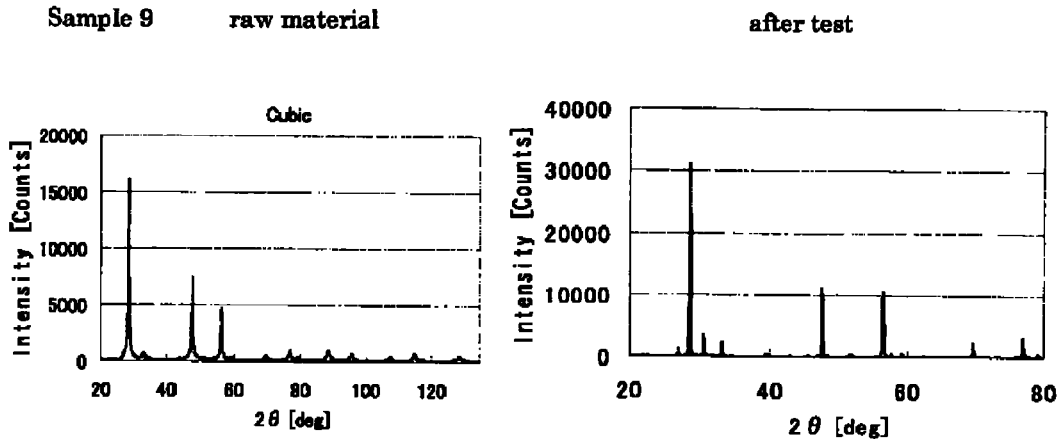

[Figure 4]
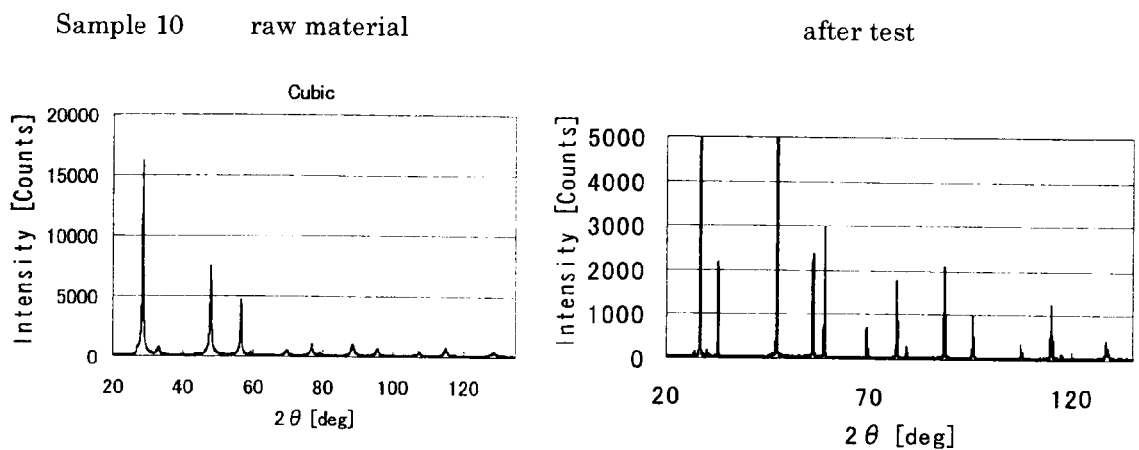

METHOD OF PREPARING FLUORESCENT BODY PRECURSOR

This application is a 371 of PCT/JP2007/064711 filed Jul. 26, 2007.

TECHNICAL FIELD

The present invention relates to a method of preparing a fluorescent body precursor. In particular, the present invention relates to a method of preparing a fluorescent body precursor, which method is characterized by comprising applying a shock pressure of 0.1 GPa or higher to a mixture of a fluorescent body base, an activator, and a co-activating particle-growth promoter to dope the activator into the fluorescent body base in the presence of the co-activating particle-growth promoter.

BACKGROUND ART

Group II-VI compound semiconductor particles comprising compounds of Group II and VI elements, e.g., semiconductor particles mainly containing zinc sulfide and the like, have properties that, when an activating element (activator) such as manganese, copper, silver, terbium, thulium, europium, and fluorine is added, the particles absorb energy of light, electron beams and the like to emit light. Thus, fluorescent bodies obtained using semiconductor particles mainly containing zinc sulfide and the like, as fluorescent body bases are used in displays such as plasma displays, electroluminescent displays, and field-emission displays.

Known methods for obtaining fluorescent body precursors using semiconductor particles mainly containing zinc sulfide and the like, as fluorescent body bases include a method comprising primary firing carried out at a very high temperature of 800° C. to 1300° C. on zinc sulfide particles, which are raw materials, together with an inorganic salt called a flux to cause the particles to grow to form micron-size particles, and secondary firing carried out at 500° C. to 1000° C. to obtain fluorescent body precursors (refer to Patent Documents 1 to 3). This method, however, uses heat to exchange ions. Thus, it is difficult to preferentially introduce a metallic element having a larger ionic radius than those of metallic elements constituting Group II-VI compound semiconductors, making it extremely difficult to obtain zinc sulfide fluorescent body particles with higher brightness.

In cases of synthesizing a Group II-VI fluorescent body precursor in a liquid phase, an activator or a co-activator can be added during particle growth, and an amount of the activator or the co-activator to be added can be controlled. This makes it possible to prepare fluorescent body particles with a homogenized concentration distribution of the activator or the co-activator in the particles. Further, monodispersed particles with a narrow particle size distribution can be obtained if nucleation and growth are separated to form the particles, and if a degree of supersaturation during the growth of particles is controlled.

Synthesizing particles under hydrothermal conditions (refer to, for instance, Patent Document 4) is a known-method for synthesizing a Group II-VI fluorescent body precursor in a liquid phase. Further, methods for controlling particle size distributions are disclosed as modified methods for adjusting liquid phases (refer to, for instance, Patent Document 5). However, although a liquid phase reaction produces an effect that cannot be obtained by a firing method, since the liquid phase reaction utilizes template effect of chelates, it is difficult to preferentially introduce a metallic element having a larger ionic radius than those of metallic elements constituting Group II-VI compound semiconductors. Thus, it is difficult to obtain zinc sulfide fluorescent body particles with higher brightness by the liquid phase reaction.

Further, application of pressure on fluorescent body precursors using an autoclave, a mechanical presser or the like, and wet ball milling of fluorescent body precursors are proposed as methods for improving luminescent performance of fluorescent bodies, and preparation of fluorescent bodies by an explosion method is also proposed (refer to, for instance, Patent Documents 6 and 7, and Non-patent Document 1).

[Patent Document 1]
  Japanese Unexamined Patent Publication No. 183954/1996 (Tokukaihei 8-183954)
[Patent Document 2]
  Japanese Unexamined Patent Publication No. 62342/1995 (Tokukaihei 7-62342)
[Patent Document 3]
  Japanese Unexamined Patent Publication No. 330035/1994 (Tokukaihei 6-330035)
[Patent Document 4]
  Japanese Unexamined Patent Publication No. 306713/2005 (Tokukai 2005-306713)
[Patent Document 5]
  Japanese Unexamined Patent Publication No. 139372/2005 (Tokukai 2005-139372)
[Patent Document 6]
  Japanese Unexamined Patent Publication No. 281451/2005 (Tokukai 2005-281451)
[Patent Document 7]
  Japanese Unexamined Patent Publication No. 336587/1994 (Tokukaihei 6-336587)
[Non-patent Document 1]
  Xiaojie Li et al, "Preparation of $SrAl_2O_4$: $Eu^{2+}$, $Dy^{3+}$ nanometer phosphors by detonation method" (2006) Materials Letters p. 3673-3677.

DISCLOSURE OF THE INVENTION

Problem to be Solved by the Invention

However, in the methods disclosed in Patent Documents 6 and 7, a Group II-VI compound semiconductor serving as a fluorescent body base is subjected to the methods above after an activator or a co-activator is doped into the Group II-VI compound semiconductor by firing or a liquid phase reaction. Thus, the methods disclosed in Patent Documents 6 and 7 also have the difficulty of preferentially introducing a metallic element having a larger ionic radius than those of metallic elements constituting Group II-VI compound semiconductors. Further, Non-patent Document 1 discloses doping of an activator by explosion. This disclosure, however, relates to doping of a rare earth metallic element at a time of preparing complex oxides, and the doping was carried out on neither a Group II-VI compound semiconductor, nor a sulfide, a selenide, or the like that is unstable with respect to oxidation.

An object of the present invention is to provide a method of preparing a fluorescent body precursor, which method enables an activator having a large ionic radius to be doped arbitrarily so that a fluorescent body providing high brightness and high energy efficiency is prepared.

Means for Solving the Problem

The present inventors diligently studied and consequently found that momentarily applying a strong shock to a mixture of a fluorescent body base to which an activator and a co-activating particle-growth promoter are added enables relatively large ions to be doped into the fluorescent body base. With this finding, the present invention was completed. Specifically, the present invention is a method of preparing a fluorescent body precursor, which method comprises applying a shock pressure of 0.1 GPa or higher to a mixture consisting essentially of a fluorescent body base, an activator, and a co-activating particle-growth promoter to dope the activator into the fluorescent body base in the presence of the co-activating particle-growth promoter. The term "fluorescent body precursor" as used herein means that a fluorescent body is obtained by subjecting the fluorescent body precursor to a treatment such as firing.

ADVANTAGE OF THE INVENTION

The present invention provides a method of preparing a fluorescent body precursor, which method comprises momentarily applying a strong shock to a mixture of a fluorescent body base to which an activator and a co-activating particle-growth promoter are added, thereby enabling an activator having a larger ionic radius than those of metallic elements constituting the fluorescent body base to be doped arbitrarily. Use of such a precursor makes it possible to obtain fluorescent bodies providing high brightness and high energy efficiency.

BRIEF DESCRIPTION OF THE DRAWINGS

[FIG. 1] This figure shows X-ray crystal diffraction patterns of sample 4 before and after a test in Example 4.

[FIG. 2] This figure shows X-ray crystal diffraction patterns of sample 8 before and after a test in Example 8.

[FIG. 3] This figure shows X-ray crystal diffraction patterns of sample 9 before and after a test in Example 9.

[FIG. 4] This figure shows X-ray crystal diffraction patterns of sample 10 before and after a test in Example 10.

BEST MODES FOR CARRYING OUT THE INVENTION

A fluorescent body base for use in the present invention is not particularly limited, as long as an activator and a co-activating particle-growth promoter can be doped, but Group II-VI compound semiconductors comprising compounds of Group II and VI elements are preferred.

Examples of Group II-VI compound semiconductors include a Group II-VI compound semiconductor arbitrarily having a single crystal of a cubic or hexagonal crystal system, or a crystal polymorph mixture of cubic and hexagonal crystal systems. Concrete examples include a single crystal of a cubic or hexagonal crystal system, such as zinc sulfide, zinc selenide, cadmium sulfide, and cadmium selenide, and a crystal polymorph mixture of cubic and hexagonal crystal systems. Among those listed above, zinc sulfide is preferred.

Examples of the activator for use in the present invention include ions of publicly-known metallic elements, such as titanium, chromium, manganese, nickel, copper, silver, gold, aluminium, gallium, indium, thallium, tin, lead, bismuth, cerium, iridium, praseodymium, neodymium, samarium, europium, gadolinium, terbium, dysprosium, holmium, erbium, thulium, and ytterbium. Among those listed above, copper, manganese, iridium, and rear-earth elements are preferred. Ions of the foregoing metallic elements are mixed in the form of salts of the metallic elements, including sulfate, and halide such as chloride and fluoride, with the fluorescent body base, and the mixture is used in a method of the present invention.

Examples of rare-earth elements include scandium, yttrium, lanthanum, cerium, praseodymium, neodymium, europium, gadolinium, terbium, dysprosium, holmium, erbium, thulium, and ytterbium, but praseodymium is preferred.

Those listed above may be used alone, but use of two or more kinds is preferred because it enables a metallic element having a larger ionic radius to be doped preferentially. It is not known why a metallic element having a larger ionic radius is introduced, but it is presumed that a metallic element having a larger ionic radius tends to more easily follow structural changes, compared with a metallic element having a smaller ionic radius, and is therefore introduced preferentially.

Preferred doping concentrations are, for instance, 1 to 4000 ppm for Mn ions, 1 to 1000 ppm for Ir ions, and 1 to ppm for Pr ions.

A mix ratio of two or more kinds of activators is neither particularly limited, nor particularly affected regardless of whether a compositional amount of a metallic element having a larger ionic radius is large or small. A ratio of the fluorescent body base and the activator to be used is not particularly limited either, but normally the activator can be used in a range of 0.001 to 5 parts by weight, or 0.002 to 1 parts by weight if effect of doping and economic efficiency are taken into consideration, with respect to 100 parts by weight of the fluorescent body base.

A method of mixing the fluorescent body base, the activator, and the co-activating particle-growth promoter is not particularly limited; they may be mixed in solid form, or may be mixed by a method in which a salt of a metallic element is dissolved into a solvent such as water and thereafter mixed and impregnated with a Group II-VI compound semiconductor.

To facilitate introduction of the activator into the fluorescent body base, the co-activating particle-growth promoter is used in the present invention. Specifically, merging the co-activating particle-growth promoter into a fluorescent body base such as a Group II-VI compound semiconductor produces the following advantages: the activator is doped promptly; the fluorescent body base such as a Group II-VI compound semiconductor grows to form particles of appropriate size; crystallization is promoted, and this can be recognized from results of measurement of a half-width of a diffraction peak during observation of X-ray crystal diffraction; and luminescent properties are improved. Further, such increase in crystallinity is obtained by large movement of crystals due to recombination in the crystals, and this movement enables larger ions to be doped efficiently. The co-activating particle-growth promoter is not particularly limited. Examples include chlorides, such as sodium chloride, potassium chloride, calcium chloride, barium chloride, magnesium chloride, and barium chloride, bromides and iodides of alkali metal elements and alkaline earth metal elements, and oxides such as zinc oxide and cadmium oxide. An amount of the co-activating particle-growth promoter to be used is not particularly limited, but normally the co-activating particle-growth promoter is used in a range of 0.1 to 20 parts if residual metallic elements and other factors are taken into consideration, or in a range of 0.2 to 10 parts by weight if effect of doping and economical efficiency are taken into consideration, with respect to 100 parts by weight of the fluorescent body base.

Although particles constituting the fluorescent body base are not particularly limited in size, since it is preferable to have no void in view of efficient application of pressure, use of a particle in a range of 1 nm to 200 μm, preferably 10 nm to 100 μm, is normally preferred.

A mixture consisting essentially of the fluorescent body base, the activator, and the co-activating particle-growth promoter is placed in a sealed container, and shock pressure is applied to the container so that the shock is transmitted to the mixture of the fluorescent body base, the activator, and the co-activating particle-growth promoter in the container. The container is not particularly limited, as long as the container is resistant to pressure and allows the fluorescent body base such as a Group II-VI compound semiconductor to be easily recovered from the container after the shock is applied. A preferred atmosphere in the sealed container is an inert gas or vacuum. Presence of oxygen is not preferred, because oxidation reaction may proceed when shock is transmitted.

In a case in which a hexagonal Group II-VI compound semiconductor is used as the fluorescent body base in the present invention, a shock pressure of 0.1 GPa or higher, preferably 0.21 GPa or higher, is applied to the hexagonal Group II-VI compound semiconductor. If the shock pressure is too low, effect of transformation of crystal systems is small. On the other hand, a shock pressure that is too high is not preferred in view of preservation of crystal forms. Therefore, a shock pressure up to 50 GPa is normally applied. A length of time to apply shock pressure is not particularly limited. If, however, the length of time is too long, crystals may be destroyed. Thus, the length of time is normally 1/10 seconds or shorter, preferably 1/100 seconds or shorter.

In a case in which a cubic Group II-VI compound semiconductor is used as the fluorescent body base in the present invention, a shock pressure of 10 GPa or higher, preferably 12 GPa or higher, is applied to the cubic Group II-VI compound semiconductor. If the shock pressure is too low, effect of transformation of crystal systems is small. On the other hand, a shock pressure that is too high is not preferred in view of preservation of crystal forms. Therefore, a shock pressure up to 50 GPa is normally applied. A length of time to apply shock pressure is normally 1/10 seconds or shorter, preferably 1/100 seconds or shorter.

A method of applying the shock pressure is not particularly limited, and any method including the following methods can be employed: methods of producing artificial diamond using explosion power of gunpowder or the like; methods using single- or multi-stage powder guns or light gas guns; and methods including application of shock by dropping a heavy object. To apply the shock pressure, use of a shock wave generator which enables application of shock pressure in a sealed container is preferred, because there is little chance that miscellaneous substances such as carbon components resulting from the method using explosion power of gunpowder or the like are mixed, and it is easier to adjust levels of shock power and crystal transformation. Exemplary shock wave generators include electromagnetic induction-type shock wave generators, high-voltage discharge-type shock wave generators, powder guns, and light gas guns, but use of a powder gun or a light gas gun is preferred in view of safety and a relatively large area where shock waves are obtained.

A temperature at the time of applying the shock pressure is not particularly limited in the present invention; the shock pressure is normally applied at a normal temperature. Although compression heat and the like is generated momentarily when the shock pressure is applied to the mixture of the fluorescent body base, the activator, and the co-activating particle-growth promoter, providing temperature or cooling is not particularly required. The following describes the present invention in detail by Examples, but the present invention is not limited to the Examples.

EXAMPLES

Example 1

One hundred grams of hexagonal zinc sulfide (RAK-LC of Sakai Chemical Industry Co., Ltd.), 0.24 g manganese sulfate, and 7.0 g magnesium chloride were placed in a polyethylene container of a mixer (Awatorirentaro ARE-250 of Thinky Corporation) and mixed at 2000 rpm for 1 minute. One gram of the resulting mixture was placed in an iron shock tester recovery capsule having a diameter of 2 cm and an internal volume of 3 $cm^3$, and a missile (with a copper shock surface having a thickness of 2 mm) of ABS was caused to collide with the recovery capsule at a speed of 300 m/second using a shock wave generator Type 20 of GM engineering, Inc. to apply a shock pressure of 5 GPa. The resulting sample obtained from the recovery capsule was washed three times with 100 g ion exchange water and then dried with hot air of 150° C., and the sample was recovered (sample 1). ICP emission analysis (product name: ICP emission analyzer IRIS AP of Jarrell Ash) was carried out on the sample 1 to measure an amount of doped metallic element. The results are shown in Table 1.

Example 2

One hundred grams of hexagonal zinc sulfide, which was the same as that used in Example 1, 0.24 g manganese sulfate, 0.027 g praseodymium fluoride, and 7.0 g magnesium chloride were placed in a polyethylene container of a mixer (Awatorirentaro ARE-250 of Thinky Corporation) and mixed at 2000 rpm for 1 minute. One gram of the resulting mixture was placed in the same recovery capsule as that used in Example 1, and, as in Example 1, a missile (with a copper shock surface having a thickness of 2 mm) of ABS was caused to collide with the recovery capsule at a speed of 300 m/second to apply a shock pressure of 5 GPa. The resulting sample obtained from the recovery capsule was washed three times with 100 g ion exchange water and then dried with hot air of 150° C., and the sample was recovered (sample 2). ICP emission analysis was carried out on the sample 2 to measure an amount of doped metallic element. The results are shown in Table 1.

Example 3

One hundred grams of hexagonal zinc sulfide, which was the same as that used in Example 1, 0.5 g zinc oxide, 0.24 g manganese sulfate, 0.027 g praseodymium fluoride, 0.012 g iridium chloride, 3.0 g barium fluoride, 3.0 g magnesium chloride, and 2.0 g sodium chloride were placed in a polyethylene container of a mixer (Awatorirentaro ARE-250 of Thinky Corporation) and mixed at 2000 rpm for 1 minute. One gram of the resulting mixture was placed in the same recovery capsule as that used in Example 1, and, as in Example 1, a missile (with a copper shock surface having a thickness of 2 mm) of ABS was caused to collide with the recovery capsule at a speed of 300 m/second to apply a shock pressure of 5 GPa. The resulting sample obtained from the recovery capsule was washed three times with 100 g ion exchange water and then dried with hot air of 150° C., and the sample was recovered (sample 3). ICP emission analysis was carried out on the sample 3 to measure an amount of doped metallic element. The results are shown in Table 1.

Example 4

The procedure of Example 3 was repeated, except that cubic zinc sulfide was used in place of the hexagonal zinc sulfide and the speed of the missile was changed to 1000 m/second to apply a shock pressure of 15 GPa, to give a sample 4. The results are shown in Table 1. Further, X-ray crystal diffraction patterns of the sample 4 before and after a test are shown in FIG. 1. Furthermore, a half-width of a peak at 2θ=33° in X-ray crystal diffraction was observed, and the results are shown in Table 2.

Example 5

The procedure of Example 3 was repeated, except that no iridium chloride was used, to give a sample 5. The results are shown in Table 1.

Example 6

The procedure of Example 2 was repeated, except that a missile (with a copper shock surface having a thickness of 2 mm) of ABS and a shock tester recovery capsule of ABS were used and a shock pressure of 0.12 GPa was applied, to give a sample 6. The results are shown in Table 1.

Example 7

The procedure of Example 2 was repeated, except that a missile (with a shock surface of ABS) of ABS was used and a shock pressure of 0.21 GPa was applied, to give a sample 7. The results are shown in Table 1.

Example 8

The procedure of Example 4 was repeated, except that an iron shock surface was used in place of the copper shock surface of the missile and a shock pressure of 17 GPa was applied, to give a sample 8. The results are shown in Table 1. Further, X-ray crystal diffraction patterns of the sample 8 before and after a test are shown in FIG. 2. Furthermore, a half-width of a peak at 2θ=33° in X-ray crystal diffraction was observed, and the results are shown in Table 2.

Example 9

The procedure of Example 4 was repeated, except that a tungsten shock surface was used in place of the copper shock surface of the missile and a shock pressure of 20 GPa was applied, to give a sample 9. The results are shown in Table 1. Further, X-ray crystal diffraction patterns of the sample 9 before and after a test are shown in FIG. 3. Furthermore, a half-width of a peak at 2θ=33° in X-ray crystal diffraction was observed, and the results are shown in Table 2.

Example 10

The procedure of Example 4 was repeated, except that a tungsten shock surface was used in place of the copper shock surface of the missile and the speed of the missile was changed to 1200 m/second to apply a shock pressure of 25 GPa, to give a sample 10. The results are shown in Table 1. Further, X-ray crystal diffraction patterns of the sample 10 before and after a test are shown in FIG. 4. Furthermore, a half-width of a peak at 2θ=33° in X-ray crystal diffraction was observed, and the results are shown in Table 2.

Comparative Example 1

Using the composition of Example 3, an inside of a firing furnace was replaced with vacuum, and a temperature was elevated by 200° C. per hour under nitrogen. Then, the composition of Example 3 was subjected to firing at 1100° C. for 6 hours. Thereafter, the composition was cooled to a room temperature over 12 hours, washed three times with 100 g ion exchange water, and then dried with hot air of 150° C. to give a sample 11. The results are shown in Table 1.

Comparative Example 2

Using the composition of Example 5, an inside of a firing furnace was replaced with vacuum, and a temperature was elevated by 200° C. per hour under nitrogen. Then, the composition of Example 5 was subjected to firing at 1100° C. for 6 hours. Thereafter, the composition was cooled to a room temperature over 12 hours, washed three times with 100 g ion exchange water, and then dried with hot air of 150° C. to give a sample 12. The results are shown in Table 1.

[Table 1]

TABLE 1

|  | Mn (ppm) | Ir (ppm) | Pr (ppm) |
| --- | --- | --- | --- |
| SAMPLE 1 | 423 | — | — |
| SAMPLE 2 | 55 | — | 188 |
| SAMPLE 3 | 57 | 57 | 167 |
| SAMPLE 4 | 68 | 112 | 197 |
| SAMPLE 5 | 57 | — | 277 |
| SAMPLE 6 | 4 | — | 121 |
| SAMPLE 7 | 6 | — | 141 |
| SAMPLE 8 | 67 | 121 | 211 |
| SAMPLE 9 | 65 | 123 | 222 |
| SAMPLE 10 | 61 | 125 | 227 |
| SAMPLE 11 | 512 | 19 | 16 |
| SAMPLE 12 | 467 | — | 33 |

Ionic Radius

Zn: 0.74 angstroms, Mn: 0.81 angstroms, Ir: 0.82 angstroms, Pr: 0.90 angstroms

It is recognized from Table 1 that with the method of the present invention, a metallic element having a larger ionic radius can be doped at a higher concentration.

[Table 2]

TABLE 2

|  | RAW MATERIAL HALF-WIDTH (°) | HALF-WIDTH AFTER TEST (°) |
| --- | --- | --- |
| SAMPLE 4 | 1.32 | 0.12 |
| SAMPLE 8 | 1.35 | 0.10 |
| SAMPLE 9 | 1.33 | 0.09 |
| SAMPLE 10 | 1.36 | 0.06 |

The results of measurement of half-widths of diffraction peaks at 2θ=33° before and after the test show that the half-widths decreased considerably, as summarized in Table 2; significant increases in crystallinity of the fluorescent body bases were observed. It is considered that, by these increases in crystallinity of the fluorescent body bases, larger ions were doped efficiently.

INDUSTRIAL APPLICABILITY

The present invention can provide a method of preparing a fluorescent body precursor, which method comprises momentarily applying a strong shock power to a mixture of a fluorescent body base to which an activator and a co-activating particle-growth promoter are added, making it possible to arbitrarily dope an activator having a larger ionic radius than those of metallic elements constituting the fluorescent body base. Use of such a precursor makes it possible to obtain a fluorescent body with high brightness and high energy efficiency.

The invention claimed is:

1. A method of preparing a fluorescent body precursor, comprising applying a shock pressure of 0.1 GPa or higher to a mixture consisting essentially of a fluorescent body base, an activator, and a co-activating particle-growth promoter to dope the activator into the fluorescent body base in the presence of the co-activating particle-growth promoter, wherein said shock pressure is applied to said mixture by a shock wave that is generated by a shock wave generator.

2. The method of preparing a fluorescent body precursor according to claim 1, wherein the fluorescent body base is a II-VI compound semiconductor constituted of a compound of Group II and Group VI elements.

3. The method of preparing a fluorescent body precursor according to claim 2, wherein the II-VI compound semiconductor is zinc sulfide.

4. The method of preparing a fluorescent body precursor according to claim 1, wherein the activator is an ion of copper, manganese, iridium, or a rare earth element.

5. The method of preparing a fluorescent body precursor according to claim 4, wherein the activator is a rare earth element and the rare earth element is praseodymium.

6. The method of preparing a fluorescent body precursor according to claim 1, wherein the activator is ions of two or more kinds of metallic elements.

7. The method of preparing a fluorescent body precursor according to claim 1, wherein 0.001 to 5 parts by weight of the activator is used with respect to 100 parts by weight of the fluorescent body base.

8. The method of preparing a fluorescent body precursor according to claim 1, wherein the co-activating particle-growth promoter is selected from the group consisting of sodium chloride, potassium chloride, calcium chloride, barium chloride, magnesium chloride, lithium bromide, sodium bromide, potassium bromide, rubidium bromide, cesium bromide, francium bromide, lithium iodide, sodium iodide, potassium iodide, rubidium iodide, cesium iodide, francium iodide, beryllium bromide, magnesium bromide, calcium bromide, strontium bromide, barium bromide, radium bromide, beryllium iodide, magnesium iodide, calcium iodide, strontium iodide, barium iodide, radium iodide, zinc oxide and cadmium oxide.

9. The method of preparing a fluorescent body precursor according to claim 1, wherein 0.1 to 20 parts by weight of the co-activating particle-growth promoter is used with respect to 100 parts by weight of the base.

10. The method of preparing a fluorescent body precursor according to claim 1, wherein an ionic radius of each of the metallic elements of the doped activator is larger than an ionic radius of a metallic element of the fluorescent body base.

11. The method of preparing a fluorescent body precursor according to claim 1, wherein the shock wave is generated by a powder gun or a light gas gun.

12. The method of preparing a fluorescent body precursor according to claim 2, wherein the activator is ions of two or more kinds of metallic elements.

13. The method of preparing a fluorescent body precursor according to claim 2, wherein 0.001 to 5 parts by weight of the activator is used with respect to 100 parts by weight of the fluorescent body base.

14. The method of preparing a fluorescent body precursor according to claim 2, wherein the co-activating particle-growth promoter is selected from the group consisting of sodium chloride, potassium chloride, calcium chloride, barium chloride, magnesium chloride, lithium bromide, sodium bromide, potassium bromide, rubidium bromide, cesium bromide, francium bromide, lithium iodide, sodium iodide, potassium iodide, rubidium iodide, cesium iodide, francium iodide, beryllium bromide, magnesium bromide, calcium bromide, strontium bromide, barium bromide, radium bromide, beryllium iodide, magnesium iodide, calcium iodide, strontium iodide, barium iodide, radium iodide, zinc oxide and cadmium oxide.

15. The method of preparing a fluorescent body precursor according to claim 2, wherein 0.1 to 20 parts by weight of the co-activating particle-growth promoter is used with respect to 100 parts by weight of the base.

16. The method of preparing a fluorescent body precursor according to claim 2, wherein an ionic radius of each of the metallic elements of the doped activator is larger than an ionic radius of a metallic element of the fluorescent body base.

17. The method of preparing a fluorescent body precursor according to claim 2, wherein the activator is an ion of copper, manganese, iridium, or a rare earth element.

18. The method of preparing a fluorescent body precursor according to claim 3, wherein the activator is an ion of copper, manganese, iridium, or a rare earth element.

19. The method of preparing a fluorescent body precursor according to claim 1, wherein the shock wave is generated by an electromagnetic induction-type shock wave generator or a high-voltage discharge-type shock wave generator.

* * * * *